(12) United States Patent
Jin et al.

(10) Patent No.: US 6,451,420 B1
(45) Date of Patent: Sep. 17, 2002

(54) ORGANIC-INORGANIC HYBRID POLYMER AND METHOD OF MAKING SAME

(75) Inventors: Dan L. Jin, Bedford; Brij P. Singh, North Royalton, both of OH (US)

(73) Assignee: nanoFilm, Ltd., Valley View, OH (US)

( * ) Notice: Subject to any disclaimer, the term of this patent is extended or adjusted under 35 U.S.C. 154(b) by 0 days.

(21) Appl. No.: 09/528,276

(22) Filed: Mar. 17, 2000

(51) Int. Cl.[7] .................................................. B32B 3/00
(52) U.S. Cl. ..................... 428/315.5; 428/447; 428/451; 351/166; 427/162; 427/167; 427/387; 106/287.16
(58) Field of Search .............................. 428/315.5, 412, 428/447, 451, 429; 106/287.16; 351/166; 427/167, 162, 387

(56) References Cited

U.S. PATENT DOCUMENTS

| | | | |
|---|---|---|---|
| 3,642,681 A | * | 2/1972 | Hermes |
| 3,986,997 A | | 10/1976 | Clark |
| 3,998,991 A | * | 12/1976 | Kaas |
| 4,173,490 A | | 11/1979 | Rotenberg et al. |
| 4,177,175 A | | 12/1979 | Baney et al. |
| 4,177,315 A | | 12/1979 | Ubersax |
| 4,186,026 A | | 1/1980 | Rotenberg et al. |
| 4,211,823 A | | 7/1980 | Suzuki et al. |
| 4,229,228 A | | 10/1980 | Rotenberg et al. |
| 4,242,416 A | | 12/1980 | Baney et al. |
| 4,348,462 A | | 9/1982 | Chung |
| 4,355,135 A | | 10/1982 | January |
| 4,401,718 A | * | 8/1983 | Medford |
| 4,407,855 A | | 10/1983 | Russell |
| 4,478,876 A | | 10/1984 | Chung |
| 4,486,504 A | | 12/1984 | Chung |
| 4,499,217 A | | 2/1985 | Yoshimura et al. |
| 4,547,397 A | | 10/1985 | Burzynski et al. |
| 4,954,591 A | | 9/1990 | Belmares |
| 4,973,612 A | | 11/1990 | Cottington et al. |
| 5,015,523 A | * | 5/1991 | Kawashima et al. |
| 5,075,348 A | | 12/1991 | Revis et al. |
| 5,102,695 A | | 4/1992 | Guest et al. |
| 5,104,929 A | | 4/1992 | Bilkadi |
| 5,188,900 A | | 2/1993 | Revis et al. |
| 5,219,654 A | * | 6/1993 | Singh et al. |
| 5,246,728 A | | 9/1993 | Rodriquez |
| 5,401,541 A | | 3/1995 | Hodnett, III |
| 5,426,131 A | | 6/1995 | Katsamberis |
| 5,459,176 A | | 10/1995 | Bae et al. |
| 5,520,952 A | | 5/1996 | Tanitsu et al. |
| 5,580,819 A | * | 12/1996 | Li et al. |
| 5,744,243 A | * | 4/1998 | Li et al. |
| 5,776,565 A | | 7/1998 | Volpe et al. |
| 6,326,326 B1 | * | 12/2001 | Feng et al. .................. 423/701 |

FOREIGN PATENT DOCUMENTS

| | | |
|---|---|---|
| AU | 543 205 B | 4/1985 |
| EP | 0816094 A | 1/1998 |
| EP | 0816095 A | 1/1998 |
| EP | 0860288 A | 8/1998 |
| WO | WO 0024831 A | 5/2000 |

OTHER PUBLICATIONS

U.S. patent application Ser. No. 09/870,221, May. 2001, Jin and Singh, 428/412.*

European Search Report of European Patent Application No. EP 01302445.0 dated Oct. 24, 2001.

* cited by examiner

Primary Examiner—Terrel Morris
Assistant Examiner—Leanna Roche
(74) Attorney, Agent, or Firm—Jones, Day, Reavis & Pogue

(57) ABSTRACT

An optically clear protective thin film having covalent chemical bonds on a molecular level between organic polymer and in situ generated silica molecules is formed from a hydrolyzed coating solution of tetraalkyl orthosilicate, epoxyalkylalkoxy silanes, (math)acryloxyalkylalkoxy silanes and solvent.

17 Claims, 1 Drawing Sheet

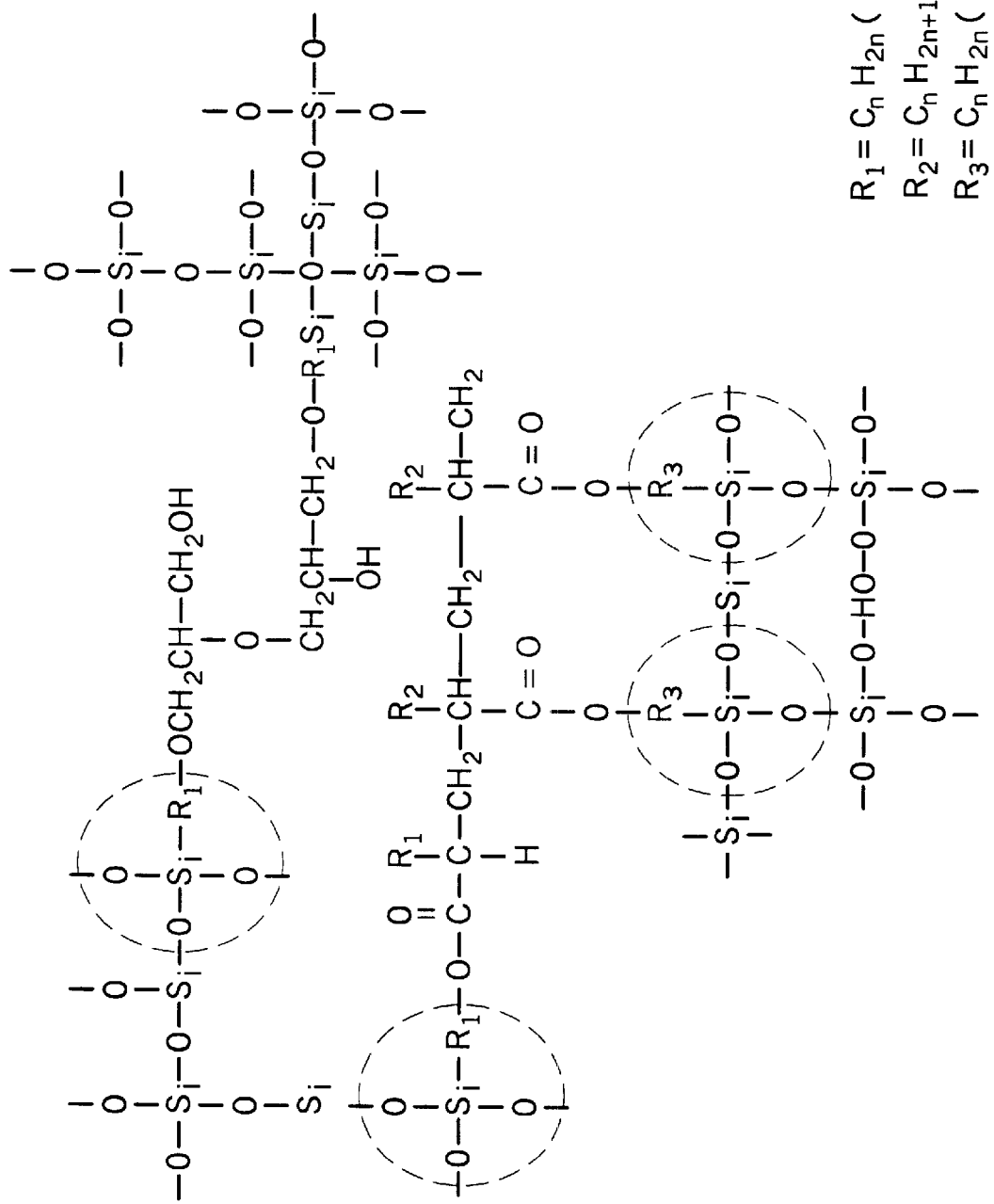

ORGANIC-INORGANIC HYBRID POLYMER AND METHOD OF MAKING SAME

BACKGROUND OF THE INVENTION

This application relates to the art of compositions and, more particularly, to an organic-inorganic hybrid polymer composition and a method of making same. The invention is particularly applicable to compositions for applying optically clear protective thin films to the surfaces of plastic eyeglass lenses and will be described with specific reference thereto. However, it will be appreciated that the invention has broader aspects and that the composition can be used for other purposes as well as for coating other plastic substrate surfaces, such as transparent display cases, windows and crystals for covering faces of clocks, watches and other instruments.

Plastic materials commonly are used for ophthalmic lenses because they are lighter, easier to process and provide better impact resistance than glass. However, the surfaces of the plastic materials used in ophthalmic lenses are relatively soft and porous compared to glass, and this frequently results in reduced optical clarity due to abrasion and staining of the lens surface. This problem may be alleviated by coating the lens surfaces with an abrasion and stain resistant thin film that commonly is known as a hardcoat.

The most desirable materials for hardcoating lenses are inorganic oxides such as quartz, fused silica, glass, aluminum dioxide, titanium dioxide and other ceramics. Because thin films of these inorganic oxides are best applied in traditional processes that reach 1000° C. or more, they cannot be used with lenses that are made of organic polymers which will decompose at such temperatures.

Inorganic oxides can be applied to organic polymers by such processes as chemical vapor deposition and the sol-gel process but it is difficult to achieve a good bond because of the inherent incompatibility between the inorganic coating and the organic substrate. The different coefficients of thermal expansion for the inorganic coating and the organic substrate tend to cause delamination. Inorganic films with sufficient thickness to adequately protect relatively soft plastic substrate surfaces may become brittle and are prone to crazing. Equipment for chemical vapor deposition also requires a large capital investment and, because the necessary high vacuum chamber is relatively small, the numbers and sizes of articles that can be processed is limited.

Polymer coating materials have been developed that provide better abrasion and stain resistance than the surfaces of the plastic materials that are used for ophthalmic lenses, and many of these coating materials include an inorganic component for enhancing the abrasion resistance of the coating. The abrasion resistant properties of these polymer coating materials increase with increasing crosslinking of the polymer molecules because the density and hardness of the protective film that is formed from the coating material increases. Most abrasion resistant polymer coatings are formed by either thermal or radiation curing. The thermal process involves a condensation reaction of reactive monomers or oligomers, while the radiation process involves free radical polymerization.

One measure of the degree of crosslinking, hardness, abrasion resistance and porosity of a coating is whether or not a protective film applied to a lens is tintable. Protective films formed from known polymer coating materials are tintable because the pores of the film are larger than the dye pigment molecules. In a known wet molecular adsorption tinting process, a coated lens is submerged in a dye bath or organic dye molecules and water maintained at 95–100° C., and this elevated temperature expands the size of the pores in the protective film by different amounts depending on the degree of crosslinking in the coating polymer. In known protective films, the pores are large enough to be penetrated by the dye molecules which range in size between about 5–30 angstroms.

Highly crosslinked polymer coatings that are more abrasion resistant than the polymers used for ophthalmic lenses are disclosed in many U.S. patents, several of which are mentioned hereafter by way of example. U.S. Pat. No. 4,407,855 discloses a pentaerythritol-based polyacrylate or polymethacrylate composition. U.S. Pat. No. 4,954,591 discloses a tintable coating composition of polyfunctional acrylate, n-vinyl derivatives and ethylenically unsaturated copolymer. U.S. Pat. No. 5,246,728 discloses a composition of tri- and tetra-acrylates in butanol. U.S. Pat. No. 5,401,541 discloses a highly crosslinked acrylic copolymer that is derived from a multifunctional aliphatic acrylate monomer. U.S. Pat. No. 5,459,176 discloses a tintable composition of polyacryloylated alkane polyols.

Although polymer coating compositions of the type described in the above patents form protective films that are much harder than the surfaces of the polymeric ophthalmic lenses, the nature of the carbon-carbon and carbon-hydrogen bonds in the films is not changed. In addition, the improvement in abrasion resistance does not approach the abrasion resistance provided by protective films of inorganic oxides.

The hardness and abrasion resistance of organic polymer coatings is improved by mixing an inorganic oxide, such as silica, with the composition that is used to form the coating. These compositions may be thermally cured or may be cured by ultraviolet radiation depending on the polymer that is used. Film coatings produced with such compositions are clear provided the individual silica particles are well dispersed and smaller than the visible wavelengths of light.

The amount of silica that can be added to a coating material for ophthalmic lenses is limited by the requirements of avoiding agglomeration of silica particles and insuring good dispersion so that the silica particles will not be visible in the protective film. Polymer compositions that include colloidal silica are disclosed in many U.S. patents, several of which are mentioned hereafter by way of example. U.S. Pat. No. 4,499,217 discloses a dispersion of colloidal silica in a thermosetting polymer. U.S. Pat. Nos. 4,973,612, 5,075,348 and 5,188,900 disclose blends of multifunctional acrylates, unsaturated organic compounds and colloidal silica. U.S. Pat. No. 5,104,929 discloses a blend of colloidal silica in ethylenically unsaturated aliphatic and/or cycloaliphatic monomers. These compositions do not have chemical bonding between the silica and the polymer, and protective thin film coatings formed with such compositions tend to fail in a relatively short time.

Attempts to alleviate the problems inherent in the lack of a chemical bond between the colloidal silica and the polymer have included the addition of reactive silane compounds to the composition for modifying the surfaces of the colloidal silica particles or for reacting with same. Disclosures of such compositions may be found in many U.S. patents, several of which are mentioned hereafter by way of example. U.S. Pat. No. 4,348,462 discloses a radiation curable composition that includes colloidal silica, acryloxy or glycidoxy functional silanes, non-silyl acrylates, and catalytic amounts of ultraviolet light sensitive cationic and radical type photoinitiators. This composition is said to cure to a transparent hard coating with improved abrasion resistance. U.S. Pat. No. 3,986,997 discloses a composition that includes colloidal silica, hydroxylated organosiloxanes and a silanol condensation catalyst. U.S. Pat. No. 4,478,876 discloses a composition that includes a blend of acrylate monomer, colloidal silica and acryloxy functional silane. U.S. Pat. No. 5,426,131 discloses a composition that includes acrylic monomers, functionalized colloidal silica and acrylated urethane. U.S. Pat. No. 4,177,315 discloses the generation of silica within the composition by hydrolyzing tetraethyl orthosilicate and aging the composition followed by the addition of organic silanol compounds to modify the preformed silica. U.S. Pat. No. 4,211,823 discloses a composition that has one or more compounds selected from a group that includes an epoxy group, a silanol group and a siloxane group, plus silica particles and an aluminum chelate. U.S. Pat. Nos. 4,242,416 and 4,177,175 disclose a composition that includes an organothiol containing siloxane resin and colloidal silica. U.S. Pat. No. 4,355,135 discloses a composition that includes siloxane and colloidal silica, and that forms a protective thin film coating that is readily tintable by conventional dyes. U.S. Pat. No. 4,486,504 discloses a composition that includes hydrolysis products of acryloxy functional silanes and/or glycidoxy functional silanes, and colloidal silica. U.S. Pat. No. 5,102,695 discloses a composition that includes colloidal silica, polysiloxane and alkylated amine formaldehyde, and that forms a thin film coating that is highly tintable by conventional dyes.

In the compositions of the aforementioned U.S. patents, silica is used to impart inorganic properties to organic polymers for improving the hardness and abrasion resistance of the compositions. The silica usually is colloidal silica having a particle size of 1–100 µm and is dispersed in water or solvent. As previously mentioned, the silica particles sometimes become visible in the protective thin film coatings formed from the compositions or otherwise interfere with the optical clarity of the lenses on which the coatings are applied.

Preformed colloidal silica particles are very porous and have a density that usually is in the range of 1.0–1.5 g/cm$^3$ depending on the process used to form the particles. In comparison, fused silica has a density of 2.0–2.1 g/cm$^3$. Because of this relatively low density and the accompanying high porosity of the preformed silica particles, thin film coatings formed with compositions that contain such particles are readily tintable by conventional dyes. The relatively porous preformed silica particles also are relatively fragile and do not significantly alter the relatively soft nature of the plastic matrix. By way of example, the structure of a thin film that is formed from a composition that includes a polymer and colloidal silica particles may be represented in a simplified form as fragile balls enveloped by relatively soft plastic resin.

For the above reasons, it would be desirable to have a film forming composition wherein a silica component is self-generated in situ within the solution during preparation of the composition, and is covalently bonded with an organic polymer component of the solution on a molecular level to provide an essentially single phase state that has no interface problems.

U.S. Pat. Nos. 4,173,490, 4,186,026 and 4,229,228 disclose compositions wherein tetraethyl orthosilicate, methyltrimethoxysilane and glycidoxypropyltrimethoxysilane are cohydrolized with water and acid, and wherein the amount of methyltrimethoxysilane is very high, such as about 50 weight percent. However, methyl is an inert organic group that dramatically reduces the possible degree of crosslinking bonds. Large amounts of methyl or phenyl groups commonly are included in these types of film forming compositions to reduce brittleness and minimize cracking at the sacrifice of film hardness. Decreased crosslinking reduces the density of a film formed by the composition so that it remains relatively porous and does not have optimum hardness. The absence of any curing compound also reduces the possible crosslinking reactions by silanol condensation and by ring opening polymerization of epoxy groups. Therefore, these compositions form thin films having a porosity such that the films also are readily tintable by conventional organic dyes. U.S. Pat. No. 4,547,397 also discloses a coating composition that includes tetraethyl orthosilicate, methacryloxytrimethoxy and/or vinyltriethoxysilane. Thin film coatings formed by this composition also do not provide optimum abrasion resistance to the surface.

It would be desirable to provide a composition that can be used to form protective thin film coatings having such a high density and low porosity that they cannot be tinted by the use of conventional dyes. Thus, the thin film coating would have a pore size at 95–100° C. and below that is smaller than 5 angstroms so that the pores cannot be penetrated by conventional dye molecules in a wet molecular adsorption tinting process. Such coatings provide high optimum abrasion and stain resistance that are superior to the abrasion and stain resistance of known protective thin film coatings.

This application will refer to several standard tests that are used in the ophthalmic lens industry to quantify the abrasion resistance and adhesion of lens coatings, and a brief description of each test follows.

Bayer Abrasion Test

The Bayer test is one in a series of standard procedures for determining the abrasion resistance of coated lenses. An abrasive media is oscillated back and forth over the surface of a coated lens under specified conditions. The abrasive media is 500 g of Alumdum 1524, and a complete test process is 600 cycles at a speed of 150 cycles/min. The quantification of abrasion resistance is based on the optical measurement of haze gain due to scratches formed on the coated lens by the oscillating abrasive media. The quantification of abrasion resistance is based on a normalized difference of the haze gain measured on the coated test lens compared to the haze gain measured on an uncoated plano lens of CR-39 resin provided as a reference by the International Standards Organization, also known as the ISO. CR-39 is trademark of PPG Industries, Inc., for allyl diglycol carbonate monomer or diethylene glycol bis(allyl carbonate) resin.

Steel Wool Test

The steel wool test is one in a series of standard procedures for determining the abrasion resistance of coated ophthalmic lenses. A standard #000 steel wool pad with 5 pounds of weight on top of it is oscillated across a coated lens at a speed of 100 cycles per minute for 200 cycles. The quantification of abrasion resistance is based on a visual comparison of the test lens to a standardized series of reference lenses. The quantification of abrasion resistance is based on a ratio of the haze gain measured on the coated lens compared to the haze gain measured on an ISO reference lens of uncoated plano CR-39.

Cross Hatch Test

This standard procedure is for evaluating the adhesion of a hardcoat or an antireflective coating on a lens. Using a cutting device such as a razor blade, six parallel cuts 1.5 mm±0.5 mm apart and approximately 15 to 20 mm in length are made in the coating on the front or convex surface of the lens. Another six parallel cuts 1.5 mm±0.5 mm apart are made in the coating perpendicular to the first set. This forms a cross-hatched pattern of squares over which tape is applied, such as 3M Scotch brand #600 and 8981. The tape then is pulled rapidly as close to an angle of 180 degrees as possible, and the percent adhesion is quantified by the amount of coating removed from the squares in the cross-hatched pattern. The 180 degree reference means that the tape is pulled back over itself in a direction that is nearly parallel to the lens surface.

Boiling Salt Water Test

This standard procedure evaluates the ability of a hardcoat or an antireflective coating to adhere to a lens and the susceptibility of the coating to crazing. A coated lens is subjected to ten cycles of thermal shock by submersing the coated lens for two minutes in a boiling salt water solution which comprises 3.5 liters of deionized water, 157.5 grams of sodium chloride, and 29.2 grams of sodium dihydrogen orthophosphate, followed by submersing the coated lens for one minute in water at 18–24° C. Coating performance is quantified by whether or not coating layer detachment or complete delamination from the lens occurs, and by whether or not crazing of the coating occurs.

Thermal Test

This standard procedure evaluates the ability of a hardcoat, an antireflective coating or a combination of both to adhere to a lens, and the susceptibility of the coating to crazing at an elevated temperature. A coated lens is subjected to six hours of thermal aging in an air circulating oven at 80° C. and coating performance is quantified by whether or not crazing of the coating occurs.

SUMMARY OF THE INVENTION

An optically clear protective thin film for polymeric eyeglass lenses and other polymeric substrate surfaces has covalent chemical bonds between polymer and silica molecules.

The protective thin film preferably has a thickness that is between 1–7 µm and most preferably between 1.5–5.0 µm.

A protective film in accordance with the present application has a very high density and a very high hardness to provide excellent abrasion and stain resistance. The high density and hardness are achieved by a high degree of cross linking between organic molecules and inorganic silica.

The improved film has such a high density that it cannot be tinted with the use of conventional dyes that are used for tinting eyeglasses.

The improved film is formed from a coating solution that includes tetraalkyl orthosilicate, expoxyalkylalkoxy silanes, (meth)acryloxyalkylalkoxy silanes and solvents.

In a preferred arrangement, a polymerizable component of the coating solution is 20–50 weight percent of the entire solution. The tetraalkyl orthosilicate comprises 40–75 weight percent of the polymerizable component, the epoxy-alkylalkoxy silanes comprises 20–45 weight percent of the polymerizable component, and the (meth)acryloxyalkylalkoxy silanes comprises 5–15 weight percent of the polymerizable component.

Between 20–80 weight percent of the solution is solvent, and 15 20–50 weight percent of the solvent is water.

From 0.1–0.5 weight percent of the solution is 2M HCl, and 0.5–2.0 weight percent of the solution is acetic acid to provide a solution pH that is 3–6.

A surfactant or wetting agent comprises 0.1–1.0 weight percent of the solution, and a catalyst or curing agent comprises 0.2–0.5 weight percent of the solution.

In one arrangement, the ratio of the amount by weight of expoxyalkylalkoxy silanes in the solution to the amount by weight of (meth)acryloxyalkylalkoxy silanes in the solution is between 15 to 1 and 0.2 to 1, and more preferably between 13 to 1 and 1 to 1.

In another arrangement, the molar ratio of water to the combined epoxyalkylalkoxy silanes and (meth)acryloxyalkylalkoxy silanes is between 1 to 4 and 3 to 1, and more preferably between 1 to 2 and 2 to 1.

The coating solution is prepared by mixing together tetraalkyl orthosilicate, epoxyalkylalkoxy silanes, (meth)acryloxyalkylalkoxy silanes, solvent, HCl and acetic acid, and stirring at room temperature to partially hydrolyze the silane groups until the solution appears to be clear by visual inspection. The solution then is heated to 60–70° C. and stirred for 1–2 hours to completely hydrolyze all silane groups and form organic-inorganic hybrid oligmers.

The solution then is cooled back down to room temperature, followed by the addition of the surfactant and the catalyst, and stirring to completely dissolve the surfactant and catalyst.

The coating solution is applied to the surfaces of polymeric lenses which then are baked in an air circulating oven at a temperature of 90–120° C. to completely polymerize the coating and form an optically clear protective film.

It is a principal object of the present invention to provide an improved coating solution for use in applying optically clear protective thin films to the surfaces of plastic eyeglass lenses and other polymeric substrates.

It is another object of the invention to provide an improved method of making a coating composition wherein silica is generated in situ within the coating solution mix during processing from the solution constituents.

It is still another object of the invention to provide a protective thin film in which organic and self-generated inorganic molecules are bonded together on a molecular level with covalent chemical bonds.

It is an additional object of the invention to provide a coating solution that does not contain preformed silica but that forms protective thin films that include self-generated silica molecules as part of a polymer hybrid.

It is a further object of the invention to provide an improved method for preparing a coating solution and for applying same to substrate surfaces in a protective thin film.

It also is an object of the invention to provide a protective base coat as a foundation or primer on plastic lens surfaces and other substrates beneath multilayer inorganic films deposited by chemical vapor deposition or sputtering methods.

It is a further object of the invention to provide a composition that cures faster on plastic surfaces.

BRIEF DESCRIPTION OF THE DRAWING

The drawing illustrates the general formula for the protective film of the present application with covalent chemical bonds between organic and inorganic molecules, and with the areas circled in dotted lines representing links between organic and inorganic components.

DESCRIPTION OF A PREFERRED EMBODIMENT

A film forming composition in accordance with the present application is made by mixing tetraalkyl orthosilicate, organic epoxies, one or more of functional trialkoxy silanes and/or methacryloxy and/or acryloxy type silanes, solvent, acetic acid and hydrochloric acid.

The solution is stirred at room temperature, which may be 10–38° C. and more commonly is 18–24° C., to partially hydrolyze the silane groups. The solution is cloudy or hazy when stirring begins, and stirring is continued at room temperature until the solution becomes clear. Once the solution becomes clear, it is heated to a temperature of 60–70° C. while stirring continues for one to two hours to completely hydrolyze all silane groups. The solution then is cooled back down to room temperature followed by the addition of a surfactant and a catalyst. Stirring is continued to dissolve the surfactant and catalyst, and to obtain a clear and homogeneous solution. The composition now is ready for use in applying an optically clear protective film to lenses or other surfaces.

The composition is applied to lens surfaces in any known manner, such as by dipping or spin coating. By way of example, a lens may be immersed in the coating solution and withdrawn at a uniform rate of 5–15 cm/min. to control the film thickness. Instead of withdrawing the lens from the solution, the solution may be drained to expose the lens at the same uniform rate of 5–15 cm/min. During withdrawal of the lens from the solution or during lowering of the solution level, the lens is positioned with its surfaces extending generally perpendicular to the solution surface i.e., the lens is edgewise to the solution surface so that the lens surface to be coated progressively exits the solution as the lens is lifted or the solution is drained. The coating then is thermally cured by placing the coated lens in an air circulating oven maintained at 90–120° C. for 30–120 minutes, and more preferably for 30–60 minutes.

The above procedure provides the lens with an optically clear protective film in which silica and polymer molecules are chemically bonded together. The chemical bonding between organic and inorganic molecules, along with a high degree of crosslinking, provides a film that has a very high density and low porosity. The film cannot be tinted by conventional dyes using conventional tinting processes, and this is a measure of the very high density and very low porosity that is achieved. Although the size of the pores themselves have not been measured, the inability of dye molecules to penetrate the pores at a temperature of 95–100° C. indicates that the pores in the protective film are smaller than 5 angstroms at and below a temperature of 95–100° C.

In many previous compositions for use in hardcoating lenses, large amounts of methyl and/or phenyl groups having inert and loose end groups are included to reduce brittleness and cracking of the hardcoat film. Because the inert and loose end groups result in less crosslinking within the composition, lens hardcoats formed from such compositions do not have optimum hardness and are readily tintable with conventional dyes using conventional tinting processes. This indicates that prior protective films have pores that are larger than 5 angstroms at and above a temperature of 95° C.

In contrast to prior compositions of the type described, all of the film forming constituents of a composition in accordance with the present application have highly reactive end groups so that every molecule has multiple reactive groups for crosslinking. The large number of reactive end groups participate in crosslinking at an elevated temperature, and provide a chemical bond between inorganic silica molecules and organic polymer molecules. The organic components always have reactive groups at both ends, and short and linear organic groups function as tight springs to enhance the toughness of a fully cured film that is formed from the composition. In a most preferred form of the composition of the present application, nonreactive free organic groups are excluded from the composition in order to achieve the hardest film.

In the composition of the present application, the component of tetraalkyl orthosilicate is a source of silica. The component of organic epoxies is a source of silica, and also provides epoxy for hardening of the film and adhesive bonding of same to a lens surface. The component of one or more of functional trialkoxy silanes and/or methacryloxy and/or acryloxy type silanes is a source of silica, and also provides acrylic to enhance film toughness and adhesive bonding of the film to a lens surface. This latter component may be termed an organofunctional group that promotes adhesion of the composition and a film formed therefrom to a lens surface along with controlling brittleness. Selection of the compounds and the amounts of them that are used in the latter component makes it possible to vary the flexibility of a film that is formed from the composition and thereby adjust the film hardness, brittleness and resistance to crazing. The component of acetic acid adjusts the pH of the solution which desirably is below six. The component of hydrochloric acid is a catalyst that promotes hydrolysis of the silane groups. During curing of a coating into an abrasion resistant protective thin film on a lens surface, tetra-silanol groups that are generated from hydrolyzed tetraalkyl orthosilicate, along with silanol groups from hydrolyzed organosilanes, proceed with a condensation reaction which is promoted by a metal chelate catalyst.

In the composition of the present application, examples of tetraalkyl orthosilicate include tetramethyl orthosilicate, tetraethyl orthosilicate, tetrapropyl orthosilicate and tetrabutyl orthosilicate. The weight percent of generated silica or silicate from tetraalkyl orthosilicate should be between 60–25 weight percent of all solids in the solution, and preferably between 50–35 weight percent of all solids in the solution.

The total amount of epoxy and methacryloxy type silanes should be between 40–75 weight percent of the total solids in solution and preferably 50–65 weight percent of all solids in the solution. The ratio of epoxy type silanes to methacryloxy type silanes should be between 15:1 to 0.2:1, and preferably between 13:1 to 1:1.

Examples of epoxy type silanes include glycidoxymethyltrimethoxysilane,
glycidoxymethyltriethoxysilane,
2-glycidoxyethyltrimethoxysilane,
2-glycidoxyethyltriethoxysilane,
1-glycidoxyethyltrimethoxysilane,
1-glycidoxyethyltriethoxysilane,
3-glycidoxypropyltrimethoxysilane,
3-glycidoxypropyltriethoxysilane,
2-glycidoxypropyltrimethoxysilane,
2-glycidoxypropyltriethoxysilane,
1-glycidoxypropyltrimethoxysilane,
1-glycidoxypropyltriethoxysilane,
4-glycidoxybutyltrimethoxysilane,
4-glycidoxybutyltriethoxysilane,
3-glycidoxybutyltrimethoxysilane,
2-glycidoxybutyltrimethoxysilane,
2-glycidoxybutyltriethoxysilane,
1-glycidoxybutyltrimethoxysilane, 1-glycidoxybutyltriethoxysilane, (3,4-epoxycyclohexyl)methyltrimethoxysilane. (3,4-epoxycyclohexyl)methyltriethoxysilane, glycidoxymethylmethyldimethoxysilane, glycidoxymethylmethyldiethoxysilane, 2-glycidoxyethylmethyldimetlhoxysilane, 2-glycidoxyethylmethyldiethoxysilane, 1-glycidoxyethylmethyldimethoxysilane, 1-glycidoxyethylmethyldietfoxysilane, 3-glycidoxypropylmethyldimethoxysilane, 3-glycidoxypropylmethyldiethoxysilane, 2-glycidoxypropylmethyldimethoxysilane, 2-glycidoxypropylmethyldiethoxysilane, 1-glycidoxypropylmethyldimethoxysilane, 1-glycidoxypropylmethyldiethoxysilane, 4-glycidoxybutylmethyldimethoxysilane, 4-glycidoxybutylmethyldiethoxysilane, 3-glycidoxybutylmethyldimethoxysilane, 3-glycidoxybutylmethyldiethoxysilane, 2-glycidoxybutylmethyldimethoxysilane, 2-glycidoxybutylmethyldiethoxysilane, 1-glycidoxybutylmethyldimetboxysilane, 1-glycidoxybutylmethyldiethoxysilane, (3,4-epoxycyclohexyl)methylmethyldimethoxysilane, and (3,4-epoxycyclohexyl)methylmethyldiethoxysilane.

Examples of methacryloxy or acryloxy type silanes include 2-methacryloxypropyltriethoxysilane, 3-acryloxypropyltrimethoxysilane, 2-acryloxypropyltriethoxysilane, 3-methacryloxypropylmethyldimethoxysilane, 2-methacryloxypropylmethyldiethoxysilane, 3-acryloxypropylmethyldimethoxysilane, 2-acryloxypropylmethyldiethoxysilane, 3-methacryloxypropyltrimethoxysilane, methacryloxypropyltris(methoxyethoxy)methoxysilane.

Water is used to hydrolyze all silane groups in the compounds that are present in the coating solution of the present application. The molar ratio of water to all silanes should be from 1:4 to 3:1, and preferably from 1:2 to 2:1. A small amount of acetic acid and hydrochloric acid is introduced to the composition to assist the hydrolysis of silanes. The pH value of the solution should be from 3–6, and more preferably 4–5.

Many different solvents can be used, including alkyl alcohols such as methanol, ethanol, n-propanol, iso-propanol, n-butanol and iso-butanol, and many other polar solvents such as ketone types, acetonitrile, tetrahydrofIran, 2-ethoxyethanol, and 2-butoxyethanol. Wetting agents such as DuPont FSN, polydimethyl siloxane type, and non-ionic surfactants such as polyethylene oxides, Brij®92 and Brij®98 may be used in the composition.

Many different metal complex compounds can be used as curing agents, such as titanium acetylacetonate, aluminum acetylacetonate, dibutyltin dilaurate, and zinc napthenate. The amount of curing agent used is from 0.4–5.0 weight percent of all solids contained in the solution, and more preferably from 1.0–3.0 weight percent of all solids in the solution.

Because the protective film of the present application is extremely hard, it can be very thin while still providing the desired protection to a lens surface. The film may have a thickness between 1–7 µm, and more preferably between 1.5–5.0 µm. The thickness of the film can be controlled by one or more of adjusting the concentration of the coating solution, by adjusting the speed at which a lens is pulled from immersion in the coating solution, by adjusting the coating solution temperature and by adjusting the coating solution viscosity. Adjusting the speed at which the lens is pulled from immersion in a coating solution bath is a convenient way to control the film thickness.

The film thickness also depends on the solids content of the coating solution and on the viscosity of the coating solution, the latter being affected by the temperature of the coating solution when the lens is immersed and pulled. Higher solids content results in a higher viscosity and a thicker film, and also reduces the shelf life of the coating solution. Lower solids content may result in a thinner film. The recommended solids content is between 15–50 weight percent of the entire coating solution, more preferably 20–50 weight percent of the entire coating solution and most preferably between 20–40 weight percent of the entire coating solution.

The shelf life or pot life of the coating solution depends on several factors including solution temperature, pH value, organic-to-inorganic ratio and solids content. In the preferred composition of the present application, all end groups of the organic-inorganic oligomers are either silanols or epoxy which can react at ambient temperature, and the reaction rate depends on the temperature of the coating solution. As is known from sol-gel chemistry, silanol groups continuously proceed with a condensation reaction and this reduces the shelf life of the coating solution. As a result of this condensation reaction, the molecular weight of the organic-inorganic oligomers increases and the coating solution becomes more viscous. It is well-known that the condensation reaction proceeds slowly at a solution pH that is between 3–6 and at lower temperatures. Low temperature storage will extend the shelf life of the coating solution. The epoxy groups are relatively stable at ambient temperature, and ring opening polymerization proceeds faster at an elevated temperature when a coating on a lens is undergoing thermal curing during final film formation.

The structure of organic-inorganic oligomers in the coating solution of the present application can be described as follows: due to the high reactivity and concentration of silanols after hydrolysis of tetraethyl orthosilicate and organoalkoxysilane, the formation of O—Si—O prevails. The reactivity of $R_{4-x}Si(OH)_x(x=1-3)$ and $Si—(OH)_4$ are similar. R groups limit or stop the silanol condensation reaction process due to steric effects. The core of the organic-inorganic oligomers may have more O-Si-O-Si three-dimensional net structure, and the outer layer may have more organic component. It is believed that the transition from the core to the outer layer is gradual. As a result, the composition of the present application is relatively stable. At room temperature, the gelation time of the coating solution is more than six months. If the coating solution is maintained between 0–15° C., it can be used after more than three months of storage.

The coating solution of the present application preferably is maintained at a temperature of 10–15° C. to provide stability of the coating solution and uniform quality of protective films that are formed therefrom. The coating solution may be at room temperature during coating of lenses but is not recommended, and the temperature also depends on the coating process that is used.

The quality of the protective film and its adhesion to a plastic substrate depend on careful control of the coating process. Great care should be taken and stringent efforts must be made at all stages of the coating process to avoid contamination and ensure cleanliness of the substrate surface, the coating solution and the coating environment.

The cleanliness and smoothness of the substrate surface is essential to the whole operation because a good coating will be obtained only if the substrate is wetted uniformly and completely by the coating solution. Any defect or dust on the substrate surface will interrupt the coating film and produce a coating flaw. There are some cleaning operations that can be carried out to ensure that uniform wetting takes place. Cleaning with solvents is a standard procedure that can include washing with a mild aqueous detergent followed by washing with organic solvents such as ethanol. The solvent that is used should not dissolve the substrate. In some cases, a preliminary treatment involving a chemical etch with an acid and a base, ultrasonic treatment, high pressure spray and heat can be used individually or in combination. Surface roughness or scratches that can interrupt the uniform flow of coating solution will produce coating flaws. Therefore, highly polished surfaces are most desirable.

Clean and dry plastic lenses or other plastic substrates may be provided with an optically clear protective film by immersing the entire article in the coating solution followed by pulling the article from the solution at a rate of 5–15 cm/min. to form a coating on the substrate surface. The article then is placed in an air circulating oven that is maintained at a temperature of 90–120° C. for 30–120 minutes to thermally cure the coating to a protective thin film. Other coatings may be provided over the protective film with no further cleaning or activation of the surface of the protective film. For example, a hydrophobic film may be applied over the protective film. The protective film also may serve as a base coat for deposition of an antireflective film by chemical vapor deposition or sputtering, and a hydrophobic film may be applied over the antireflective film.

An example of applying a protective film to a lens in accordance with the present application follows:

EXAMPLE I

A coating solution is prepared by mixing 104.0 g of tetraethyl orthosilicate, 45.0 g of glycidoxypropyltrimethoxysilane, 5.0 g methacryloxypropyltrimethoxysilane, 119.0 g of isopropyl alcohol, 43.0 g of water, 0.4 g of 2M HCl and 3.2 g of 2M acetic acid. The solution is stirred at room temperature to partially hydrolyze the silane groups until a clear solution is obtained. The solution is then heated up to and maintained at 60–70° C. for 1–2 hours while continuing the stirring to completely hydrolyze all silane groups. The solution is then cooled to room temperature, followed by the addition of 1.6 g of Brij®98 surfactant and 1.2 g of aluminum acetylacetonate catalyst. The solution then is stirred to dissolve the solids, and to obtain a homogeneous and clear solution.

A CR-39 lens is cleaned dried and immersed into the coating solution and withdrawn edgewise with the lens surfaces generally perpendicular to the solution surface at a rate of 5–15 cm/min. In the alternative, the coating solution may be drained to expose the lens at the same rate of 5–15 cm/min. The coated lens is placed in an air circulating oven maintained at 90–120° C. for 30–120 minutes to cure the coating.

After cooling down to room temperature, the coated lens is subjected to 600 cycles of Bayer abrasion testing. The coated lens measures 3–4% haze, compared with 20–25% haze for an uncoated CR-39 lens after 600 cycles of Bayer abrasion testing. Table 1 gives the results of a Bayer test on commercially available lenses and on a lens that has the hybrid organic-inorganic hardcoat of the present application in accordance with Example 1.

TABLE 1

| Lens | Base Lens Material | Bayer Ratio | Haze after Bayer (%) | Manufacturer |
| --- | --- | --- | --- | --- |
| Bare CR-39 | CR-39 | — | 20–25 | Essilor |
| CR-39 Truetint | CR-39 | 2.06 | 10.9 | Essilor |
| CR-39 Permagard | CR-39 | 2.30 | 9.8 | Sola |
| Poly-Orcolite | Polycarbonate | 1.13 | 20.0 | Vision-Ease |
| Poly-Gentax PDQ | Polycarbonate | 1.36 | 16.6 | Gentax |
| Poly-Gentax GLC | Polycarbonate | 3.04 | 7.4 | Gentax |
| Example I | CR-39 | 7.5–4.5 | 3–4 | Applicant |

The coating solution does not provide satisfactory adhesion to all types of lens materials, such as high index and polycarbonate, and an activator or primer layer may be required before applying the coating in order to insure a good bond to the lens surface. The bonding layer usually comprises coupling agents such as 3-aminopropyltrimethoxysilane, 2-aminoethyl-3-aminopropyltriethoxysilane, 3-aminopropylmethyldimethoxysilane, 2-aminoethyl-3-amino-propylmethyldiethoxysilane, etc. The use of coupling agents should not interrupt the flow of the coating solution on the lens surface.

The following is an example of the coating composition of the present application used as a base coat for other inorganic films, such as antireflective films, deposited by any known process such as chemical vapor deposition or sputtering.

EXAMPLE II

A scratch resist coating solution is prepared by mixing 313 g of tetraethyl orthosilicate, 200 g of glycidoxypropyltrimethoxysilane, 40 g methacryloxypropyltrimethoxysilane, 472 g of isopropyl alcohol, 144 g of water, 1.2 g of 2M HCl and 10.8 g 2M HAc. The solution is stirred at room temperature to partially hydrolyze the silane groups until a clear solution is obtained. The solution is then heated up to and maintained at 60–70° C. for 1–2 hours while continuing the stirring to completely hydrolyze all silane groups. The solution is then cooled to room temperature followed by the addition of 6.0 g of Brij®98 surfactant and 4.0 g of aluminum acetylacetonate catalyst. The solution is then stirred to dissolve the solids, and obtain a homogeneous and clear solution.

A CR-39 lens is cleaned, dried and immersed into the coating solution followed by withdrawal edgewise with the lens surfaces generally perpendicular to the solution surface at a rate of 5–15 cm/min. The coated lens is placed in an air circulating oven at 90–120° C. for 30–120 minutes to cure the coating. A polycarbonate lens is cleaned and dried, primed with a solution of 0.5–5 weight percent aminosilane in methanol, or ethyl alcohol, or isopropyl alcohol, or a mixture of them. The polycarbonate lens then is immersed into the coating solution and withdrawn at a rate of 5–15 cm/min. An antireflective film can be deposited immediately after curing of the coating, and a hydrophobic film is then applied on top of the antireflective film. The hydrophobic film may be of the type described in U.S. Pat. No. 5,219,654 to Singh et al, the disclosure of which is hereby incorporated herein by reference. The lens coated with a base coat of the present application along with the antireflective film and an hydrophobic film is subjected to 600 cycles of Bayer abrasion testing, the steel wool test, the boiling salt water test, and the thermal test. The tape cross hatch test is carried out both after curing of the base coat and after application of the antireflective film but before application of the hydrophobic film. The test results are summarized in Table 2 where AR means that the lens included an antireflective coating.

TABLE 2

| Lens Material | Bayer Ratio | Haze after Bayer (1%) | Manufacturer |
|---|---|---|---|
| Bare CR-39 | 1.00 | 20–25 | Essilor |
| Bare CR-39 w/AR | 1.36 | 16.5 | Essilor |
| CR-39 Truetint | 2.06 | 10.9 | Essilor |
| CR-39 Truetint w/(Zeiss)AR | 1.61 | 10.3 | Essiior |
| CR-39 Permagard | 2.30 | 9.8 | Sola |
| CR-39 Permagard w/(Zeiss)AR | 1.18 | 19.0 | Sola |
| CR-39 Truetint $TD_2$ | 4.09 | 5.5 | Essilor |
| CR-39 Truetint $TD_2$w/(Zeiss)AR | 1.13 | 5.5 | Essilor |
| CR-39 Crizal w/AR | 2.37 | 9.5 | Essilor |
| CR-39 UTMC w/AR | 2.50 | 9.0 | Sola |
| Bare Polycarbonate | 0.4–0.6 | 40–60 | Oracle |
| Poly-Diamonex | 3.46 | 6.5 | Diamonex |
| Poly-Diamonex w/AR | 2.27 | 9.9 | Diamonex |
| Poly-Sola-Multi C w/AR | 2.53 | 8.9 | Sola |
| Example II CR-39 + Base Coat + AR | 7.5–4.5 | 3–5 | Applicant |
| Example II Polycarbonate + Base Coat + AR | 5.5–3.7 | 4–6 | Applicant |
| Glass Lens w/AR ($MgF_2$) | 10.71 | 2.1 | Zeiss |
| Glass Lens w/AR | 3.13 | 7.2 | Zeiss |

From Table 2, the Bayer test results indicate that an antireflective film applied on top of any hardcoat impairs the scratch-resistance of the lens. For example, the haze reading after Bayer tests on a CR-39 Permagard lens is 9.8% without an antireflective film and is 19.0% with an antireflective coating. The CR-39 Truetint, CR-39 $TD_2$ and Poly-Diamonex lenses all show the same phenomenon. This could be due to physical and/or chemical incompatibilities between the antireflective film and the base hardcoat even after surface activation procedures are performed. In contrast, an antireflective film applied to a base hardcoat in accordance with the present application provides much better results. As shown in Table 2, the haze reading after the Bayer test for a CR-39 lens having an antireflective film applied over a base hardcoat in accordance with the present application is only 3–5, and for a polycarbonate lens it is 4–6. It is believed that this improvement is due in part to the excellent compatibility between the physical and chemical properties of anitreflective films and films formed with the coating solution of the present application. This provides superior adhesion of the antireflective film to the base hardcoat of the present application without requiring any surface activation procedures on the base hardcoat. Scratches on lenses coated with the improved protective film of the present application are much finer and less visible than scratches on lenses with prior art coatings.

Thermal tests such as the boiling salt water test serve to evaluate the adhesion between an antireflective film and a base layer, as well as between a base layer and plastic substrates to which the base layer is applied. Table 3 tabulates the tests on lenses coated in accordance with Example II in comparison to tests on commercially available lenses. The most significant improvements provided by the coating of the present application are in the boiling salt water test and the thermal test. Antireflective lenses having a base hardcoat in accordance with the present application are the only ones that grade 5 in the boiling salt water test and this compares to a grade of 0 for the other lenses.

TABLE 3

| Test | | Lens A | Lens B | Lens C | Example II Lens |
|---|---|---|---|---|---|
| Bayer Ratio | | 2.46 ± 0.28 | 4.43 ± 0.32 | 4.14 ± 0.44 | 8.84 ± 0.33 |
| Steel Wool haze gain | | 1.1 | 0.2 | 0.5 | 0.3 |
| Boiling Salt Water | A Effects | A0 | A0 | A0 | A5 |
| | B Effects | B5 | B5 | B5 | B5 |
| | C Effects | C5 | C5 | C5 | C5 |
| Crosshatch Adhesion | | 5 | 5 | 5 | 5 |
| Thermal Test | A Effects | A0 | A0 | A0 | A5 |
| | B Effects | B5 | B5 | B5 | B5 |
| | C Effects | C5 | C5 | C5 | C5 |

The following is an explanation of the meaning of the codes and designations used in Table 3. CR-39 is a registered trademark of PPG Industries, Inc., for allyl diglycol carbonate. Lens A is a lens of CR-39 that has a manufacture hardcoat, an antireflective film and a hydrophobic film, and is marketed under the trademark Carat, a trademark of Carl-Zeiss-Stiftung. Lens B is a lens of CR-39 that has a manufacture hardcoat and an antireflective film, and is marketed under the trademark UTMC, a trademark of Pilkington Visioncare, Inc. for ophthalmic lenses. Lens C is a lens of CR-39 with a manufacture hardcoat, an antireflective film and a hydrophobic film, and is marketed under the trademark Crizal, a trademark of Essilor International for ophthalmic lenses; namely, spectacle lenses, spectacle lenses of plastics material, sunglass lenses, tinted spectacle lenses, photosensitive spectacle lenses; spectacle frames; contact lenses; cases for the aforesaid goods. The Example II lens is the CR-39 lens coated according to Example II with the protective base hardcoat film of the present application plus an antireflective film and an hydrophobic film. The Bayer Ratio is the ratio of haze gain on International Standards Organization lenses divided by the haze gain of tested lenses. The results are based on ten tested samples.

In Table 3, A Effects for the Boiling Salt Water test and the Thermal Test is the quantification of crazing results. A5 means no visible crazing, A4 means barely visible points, cracks or hairline crazing, A3 means hairline crazing on up to 25% of the lens surface, A2 means hairline crazing on up to 75% of the lens surface, A1 means hairline crazing over the entire lens surface, and A0 means severe fern-like or matt-like crazing over any region of the lens.

In Table 3, B Effects for the Boiling Salt Water Test and the Thermal Test is the quantification of results for delamination by interlayer detachment. B5 means no delamination of individual layers over the entire lens surface, B4 means partial delamination of individual layers on up to 25% of the surface, B3 means partial delamination of individual layers on up to 75% of the surface, and B2 means total delamination of individual layers over the entire lens surface.

In Table 3, C Effects for the Boiling Salt Water Test and the Thermal Test is the quantification of results for delamination by complete coating detachment. C5 means no coating delamination of all layers from the lens surface, C4 means delamination of all layers up to 25% of the surface, C3 means delamination of all layers up to 75% of the surface, and C2 means complete coating delamination over the entire lens surface.

In Table 3, the results of the Crosshatch Adhesion test are graded between 0–5. A grade of 5 means that the edges of the cuts are completely smooth and none of the squares in the cross hatched area are detached; a grade of 0 means the coating has flaked along the edges of the cuts in large ribbons and whole squares are detached in an affected area that is greater than 65% of the lens surface area.

In a most preformed form of the present application, the composition and the film formed therefrom contains no preformed silica, such as colloidal silica. Thus, all of the silica in the composition and the cured film is self-generated in situ during preparation of the composition from silica precursor components that are used to prepare the composition. Preformed colloidal silica has a density of 1.0–1.5 g/cm$^3$, and the self-generated silica in the composition of the present application is believed to have a density that is significantly greater than 1.5 g/cm. The self-generated silica is believed to have a density somewhat less than the density of 2.0–2.1 g/cm$^3$ for fused silica. Thus, the self-generated silica is believed to have a density intermediate 1.5 g/cm$^3$ to 2.1 g/cm$^3$, and to be closer to 2.1 g/cm$^3$ than to 1.5 g/cm$^3$.

Although the cured film was not tintable by organic molecules in a wet molecular adsorption process, it may be possible to add dyes to the solution during mixing of the composition in order to produce a film that is tinted instead of being optically clear.

The film of the present application can be cured much faster than previous films, a full cure being achieved in less than one hour and most preferably in not more than thirty minutes. Although the size of the pores in the cured film has not been measured, it is believed to be less than five angstroms because that is believed to be the smallest size of the organic molecules in the dyes that are used for tinting eyeglass lenses in a wet molecular adsorption process.

Although the invention has been described with reference to a preferred embodiment, it is obvious that equivalent alterations and modifications will occur to others skilled in the art upon the reading and understanding of this specification. The present invention includes all such equivalent alterations and modifications, and is limited only by the scope of the claims.

What is claimed:

1. A plastic substrate having an optically clear thin film bonded thereto, said thin film having organic polymer and generated silica molecules chemically bonded together by covalent bonds, said film being the polymerized product of oligomers from hydrolysis of tetraalkyl orthosilicate, epoxyalkYlalkoxy silanes, (meth)acryloxyalkylalkoxy silanes, and solvent, and said film having a thickness not greater than 7 $\mu$m.

2. The substrate of claim 1 wherein said substrate is a plastic eyeglass lens.

3. The substrate of claim 1 including an antireflective coating bonded to said film.

4. The substrate of claim 1 including an optically clear hydrophobic film of amphiphilic molecules bended to said thin film.

5. The substrate of claim 1 wherein said substrate is a plastic eyeglass lens, and a primer layer interposed between said lens and said thin film.

6. An optically clear protective film having organic polymer and generated silica molecules chemically bonded together by covalent bonds, said film being the polymerized product of oligomers from hydrolysis of tetraalkyl orthosilicate, epoxyalkylalkoxy silanes, (meth)acryloxyalkylalkoxy silanes, and solvent, and said film having pores smaller than five angstroms.

7. The film of claim 6 wherein said film has a thickness not greater than 7$\mu$m.

8. The film of claim 6 wherein said film is bonded to a plastic substrate surface and said film suffers no visible crazing after undergoing a Boiling Salt Water Test or a Thermal Test.

9. The film of claim 8 wherein said plastic substrate is an eyeglass lens.

10. The film of claim 8 including a primer layer interposed between said film and said substrate surface.

11. The film of claim 6 including an antireflective coating bonded to said film.

12. The film of claim 11 including an hydrophobic film of amphiphilic molecules bonded to said antireflective coating.

13. An optically clear protective film having organic polymer and generated silica molecules chemically bonded together by covalent bonds, said film being the polymerized product of a coating solution that includes epoxyalkylalkoxy silanes, tetraalkyl orthosilicate, (meth)acryloxyalkylalkoxy silanes and solvent.

14. The film of claim 13 wherein said coating solution has a pH between 4–6.

15. The film of claim 13 wherein said film has pores smaller tan five angstroms.

16. The film of claim 13 wherein at least said epoxyalkylalkoxy silanes have molecules with multiple reactive groups for crosslinking.

17. The film of claim 13 wherein at least said epoxyalylalkoxy silanes have molecules with reactive groups at both ends for crosslinking.

* * * * *

UNITED STATES PATENT AND TRADEMARK OFFICE
CERTIFICATE OF CORRECTION

PATENT NO. : 6,451,420 B1
DATED : September 17, 2002
INVENTOR(S) : Dan L. Jin and Brij P. Singh It is certified that error appears in the above-identified patent and that said Letters Patent is hereby corrected as shown below:

Column 16,
Line 21, change "bended" to -- bonded --
Line 56, change "tan" to -- than --

Signed and Sealed this

Seventeenth Day of December, 2002

JAMES E. ROGAN
*Director of the United States Patent and Trademark Office*